United States Patent

Smithson

[11] Patent Number: 6,155,513
[45] Date of Patent: Dec. 5, 2000

[54] RETRACTOR LOCKING MECHANISM

[75] Inventor: Alan G. Smithson, Wetheral, United Kingdom

[73] Assignee: Breed Automotive Technology, Inc., Lakeland, Fla.

[21] Appl. No.: 09/142,191
[22] PCT Filed: Mar. 5, 1997
[86] PCT No.: PCT/GB97/00614
    § 371 Date: Jan. 21, 1999
    § 102(e) Date: Jan. 21, 1999
[87] PCT Pub. No.: WO97/32760
    PCT Pub. Date: Sep. 12, 1997

[30] Foreign Application Priority Data

Mar. 5, 1996 [GB] United Kingdom .................. 9604676

[51] Int. Cl.⁷ .......................... B65H 75/48; B60R 22/415
[52] U.S. Cl. .................................. 242/383.2; 242/383.4; 280/806; 297/478
[58] Field of Search .......................... 242/383.2, 383.4, 242/383.5; 280/806; 297/478

[56] References Cited

U.S. PATENT DOCUMENTS

| | | | |
|---|---|---|---|
| 3,421,605 | 1/1969 | Hansen | 242/383.5 X |
| 4,177,962 | 12/1979 | Hildebrandt | 242/383.5 |
| 4,190,213 | 2/1980 | Ueda | 242/383.4 |
| 4,429,841 | 2/1984 | Kassai | 242/383.4 |
| 4,461,434 | 7/1984 | Butenop | 242/383.2 |
| 5,480,105 | 1/1996 | Fujimura et al. | 242/383.2 |
| 6,015,164 | 1/2000 | Yano | 280/806 |
| 6,068,208 | 5/2000 | Matsuki et al | 242/383.2 |

*Primary Examiner*—Donald P. Walsh
*Assistant Examiner*—Collin A. Webb
*Attorney, Agent, or Firm*—Markell Seitzman

[57] ABSTRACT

A retractor for a vehicle restraint system has a locking mechanism comprising an additional inertia member (7) which decouples from the webbing spool when a predetemined acceleration or deceleration force is exceeded, due to the pretensioning operation taking place, and operates a locking pawl (3) to prevent further movement of the spool. The locking pawl (3) is then positively held in the locking condition using a spring catch (9) integral with the inertia member (7), or it can be spring biased in the locking condition using a spring displacing the inertia member (7) against the locking pawl (3) once shear pins (8) have been destroyed. This prevents webbing payout in a multiple crash situation, and provides a positive indication that the pretensioner has fired.

16 Claims, 5 Drawing Sheets

RETRACTOR LOCKING MECHANISM

BACKGROUND AND SUMMARY OF THE INVENTION

The present invention relates to a retractor locking mechanism for vehicle safety restraints and particularly to such a mechanism for a retractor fitted a with pretensioner.

Known retractors for vehicle safety restraints have two sensors. A so-called vehicle sensor detects rapid acceleration or deceleration of the vehicle, indicative of a crash situation, and operates a locking mechanism in response to such a condition to prevent further webbing withdrawal from the retractor. A webbing sensor traditionally uses an inertia disc rotating with the spool to detect rapid withdrawal of webbing, again indicative of a crash situation, and to lock the webbing spool against further rotation in response to such rapid withdrawal.

Recently pretensioning systems have been incorporated to improve safety restraints. These devices take up slack in the webbing to more securely locate the vehicle occupant in his seat in the event of a crash. Rapid acceleration or deceleration of a vehicle typically triggers an explosive device to pull a cable and rapidly rotate the retractor spool in a webbing winding direction. A webbing intake of 200 mm in approximately 10 ms is required for the pretensioner to be effective.

At these rates of acceleration the applicant has observed that the web sensor is prelocked by the operation of the pretensioner.

The web sensor has an earlier phasing geometry than the vehicle sensor so that it tends to cause engagement of the main locking member earlier than the vehicle sensor does.

It is an object of the present invention to take advantage of the earlier phasing geometry of the webbing sensor and to provide a locking mechanism which is actuated via the webbing sensor and which locks the retractor spool permanently against further webbing withdrawal. Such a locking mechanism has the advantage of preventing webbing payout in a multiple crash situation and of being a tangible sign that a pretensioner has fired and preventing re-use of the retractor after an accident.

According to the present invention there is provided a locking mechanism for a webbing retractor for a vehicle safety restraint system, the retractor comprising safety restraint webbing wound on a rotatable spool, and on inertia member mounted for rotation with the spool under normal usage conditions and means coupling the inertia member to the spool so that it rotates with the spool under normal usage conditions, and is decouplable by acceleration or deceleration forces above a predetermined level (e.g. indicative of a pretensioning operation) to decouple the inertia members and the spool and wherein holding means are operable by the inertia member to hold a locking pawl in locking engagement with the spool to lock the spool against rotation.

Preferably the retractor comprises a web sensor having a web sensor inertia element mounted to rotate with the spool and the inertia member under normal usage conditions and resiliently connected to the locking paw in such a way that when the spool is rotated faster that a predetermined speed the inertia element lags the spool and via the resilient means moves the locking pawl into locking engagement with the spool to lock the spool against rotation.

Preferably the coupling means comprise shear pins or deformable elements which nay be formed integrally with the inertia member and which shear or bend respectively under high acceleration or deceleration forces to allow rotation of the inertia member independently of the spool. Advantageously the shear pins are located in indentations or blind holes to prevent the loose parts fouling the retractor mechanism after they have fractured.

According to a particular preferred embodiment the holding means comprises an integrally moulded detent on the second inertia member. The inertia member may be provided with a spring bias adapted to bias the holding means to lock onto the locking means on operation of the mechanism of the invention. This bias could be a coiled torsion spring linking the inertia member to the web sensor inertia element. A spring catch may also be provided to positively lock the locking means: for example an integrally moulded clip on the inertia member. Parts of the mechanism may be made of zinc casting or of moulded plastic materials.

The coupling between the inertia member and the web sensor inertia element (which may each be of a general disc form) is such that during normal operation of the retractor, the inertia mean member plays no part in the function of the web sensor (and its inertia element) because the angular accelerations experienced by the mechanism during normal operation are too low to cause decoupling eg. to shear the connecting pins or deform the deformable coupling.

For a better understanding of the present invention and to show how the same may be carried into effect, reference will now be made to the accompanying drawings in which:

DETAILED DESCRIPTION OF THE DRAWINGS

Figure 1:
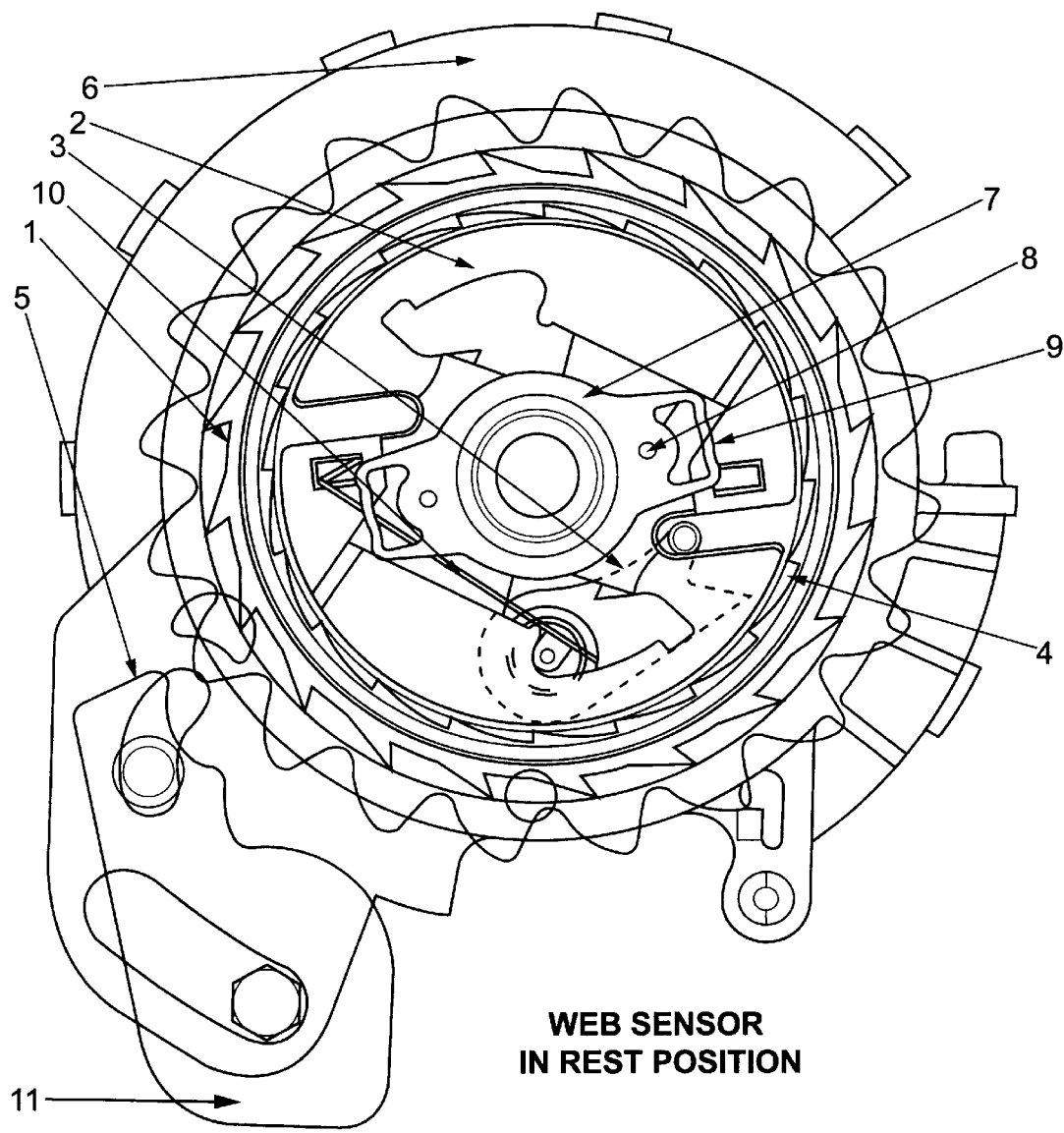
FIGS. 1–3 are cross sectional views of a mechanism according to the invention under conditions corresponding to normal retractor operation, web sensor normal lock and web sensor pretensioning lock respectively.

In FIG. 1 a cross sectional side view of a mechanism according to the invention is shown. The end of the spool is shown at 1 and on this is mounted a web sensor inertia member or element, such as disc which under normal conditions of use of the retractor rotates with the spool. The operation of the web sensor inertia disc is well known to anyone working in the field of retractors. It is connected to the spool by resilient means such as a spring and under conditions of high acceleration i.e. when the webbing is unwound suddenly as in a crash situation, the inertia disc 2 lags behind the spool and operates a pawl 3 to lock the spool against further rotation. This pawl engages teeth 4 on the inside of the end of the spool 1 and subsequently a load bearing lockbar 5 is brought into engagement with the lock cup 6 to prevent webbing payout from the spool in a crash condition.

Figure 2:
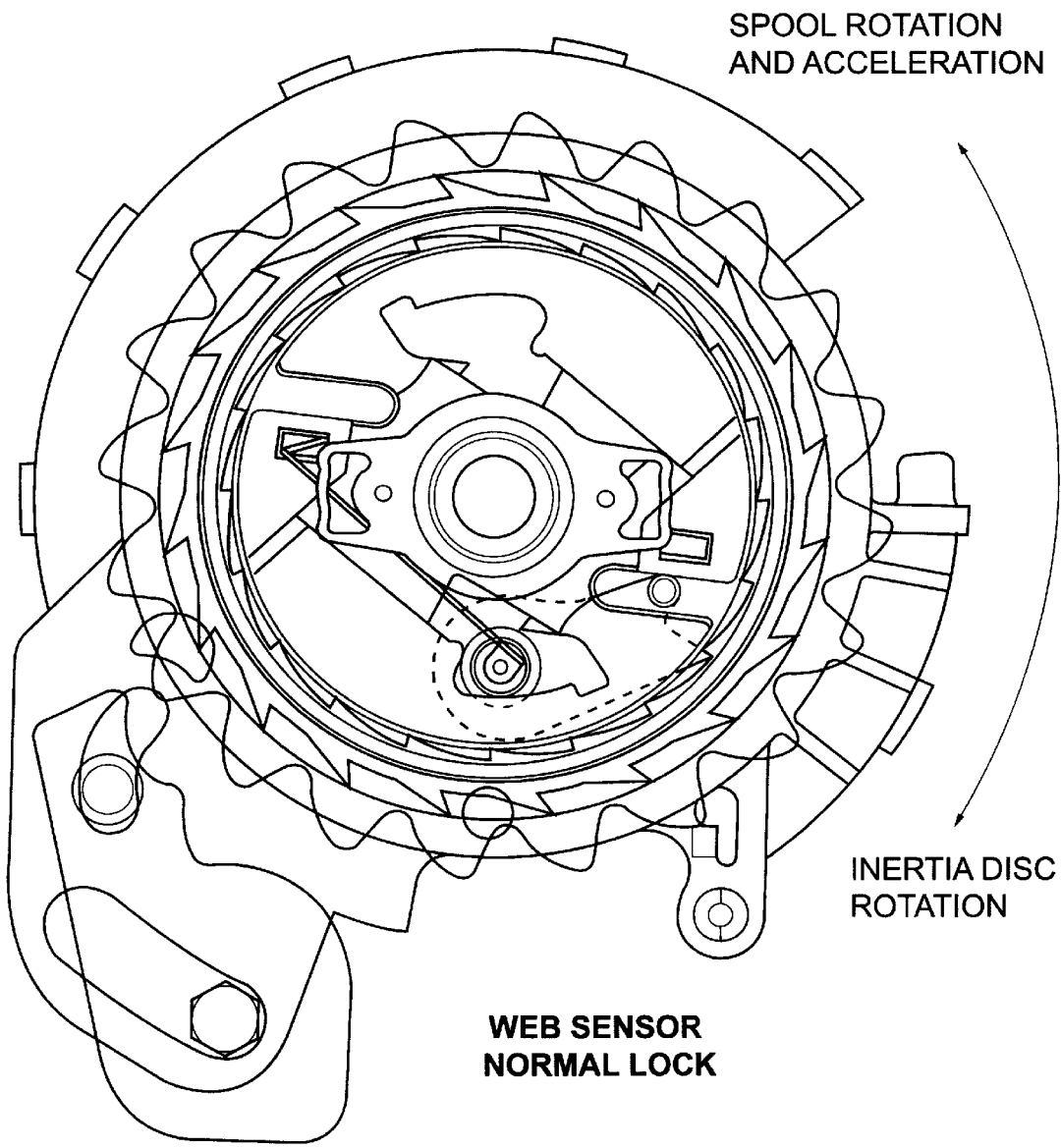
Figure 3:
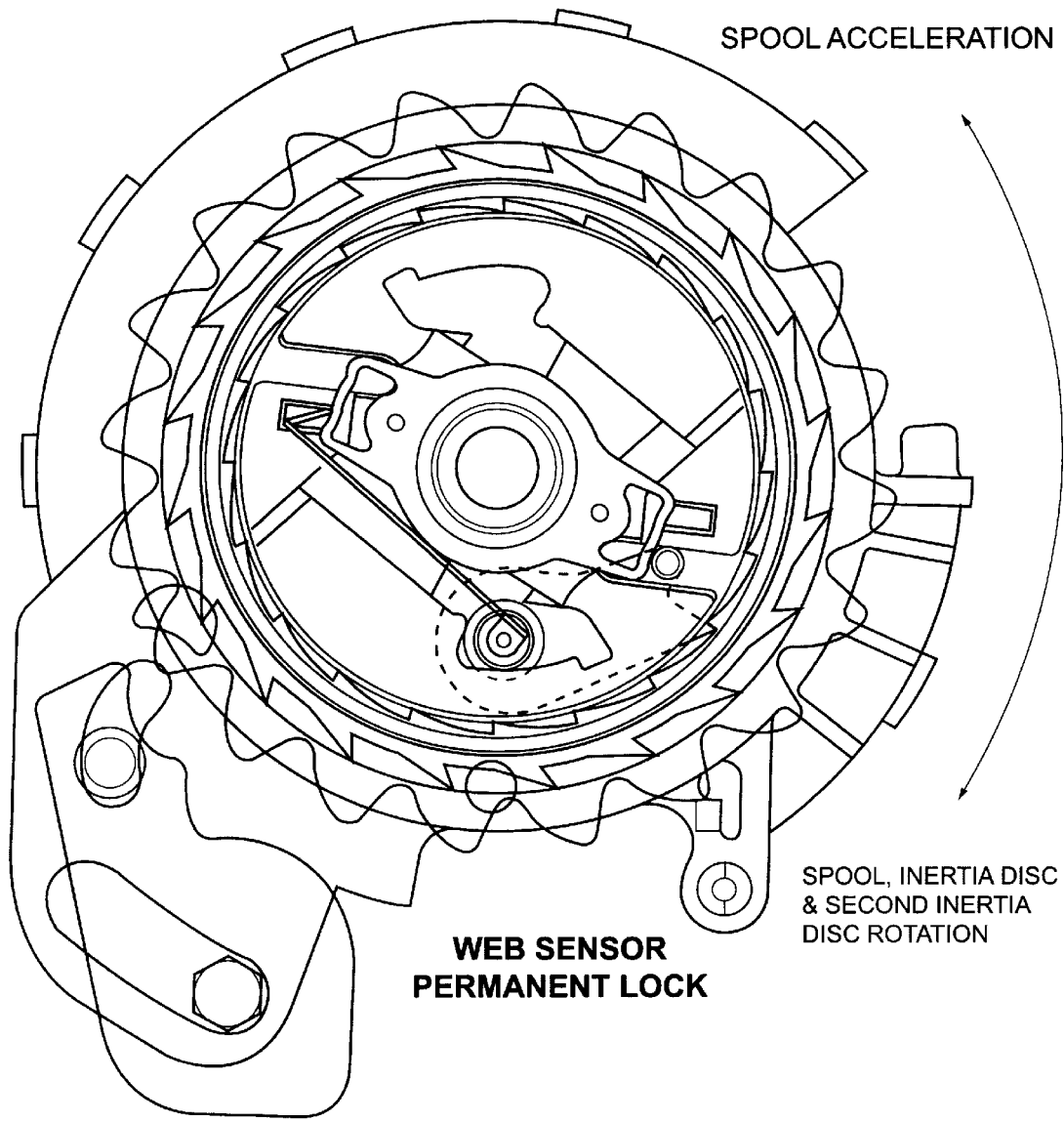

According to the invention, a second inertia member or element, such as a disc 7 is coaxially mounted with the first inertia disc 2 and is connected thereto by shear pins 8. Under conditions of particularly high deceleration, such as after firing of a pretensioner, the angular accelerations are sufficient to break the shear pins 8 and to allow the second inertia disc 7 to rotate (clockwise as shown in FIG. 1). Upon rotation, one of the extensions 9 on the second inertia disc engages locking pawl 3 and holds it in the spool locking position. This sequence is shown in FIGS. 1–3 where like features are identified by like reference numerals. FIG. 1 shows the web sensor in a rest position with the pawl 3 disengaged. This is the situation during normal operation of the retractor. In a crash situation the first inertia disc 1 lags behind the spool, and moves relative to the spool in a clockwise direction as shown in FIG. 2 by arrow A. In the position shown in FIG. 2 it engages pawl 3, moving it against the action of spring 10 into engagement with the teeth 4 on the inside of the spool. If the crash situation has activated the pretensioner then the acceleration forces will be such that the shear pins 8 break and the second inertia disc 7 rotates further in direction A so that extension 9 moves to engage pawl 3, behind the pawl post 12 so as to hold the pawl 3 in a locking position. Hence if further, crashes are experienced for example in the event of a multiple vehicle pile up, the retractor will not release any more webbing and the vehicle occupant is securely restrained in his seat.

Figure 4A:
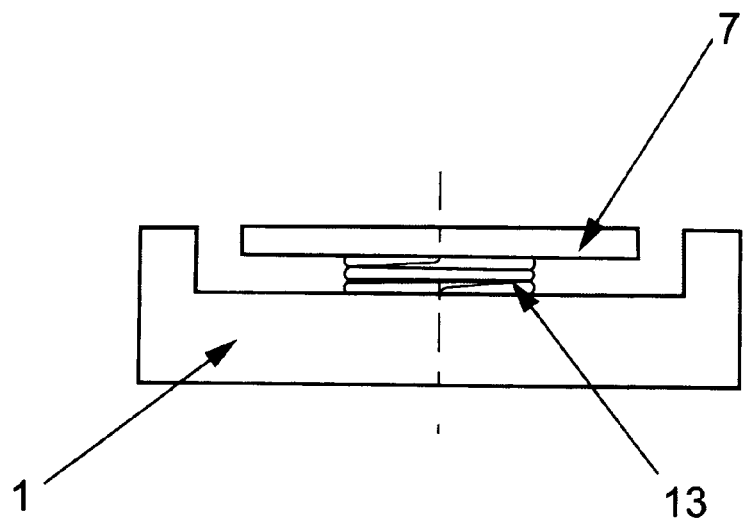
FIGS. 4a and 4b are cross sectional side and schematic plan views respectively of parts of a preferred embodiment of the invention.
Figure 4B:
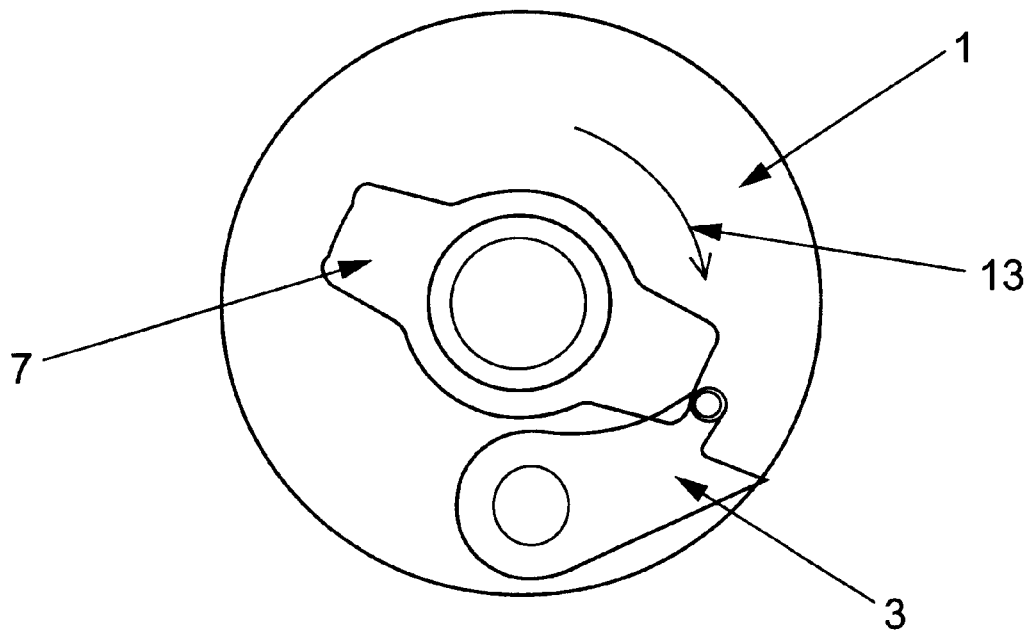

FIGS. 4a and 4b show a preferred embodiment of the invention wherein the first inertia disc 1 is linked to the second inertia disc 7 by a coiled torsion spring or similar bias means 13. This torsion spring acts to push the second inertia disc 7 into holding engagement with the web sensor pawl 3 once the shear pins 8 have broken.

Figure 5:
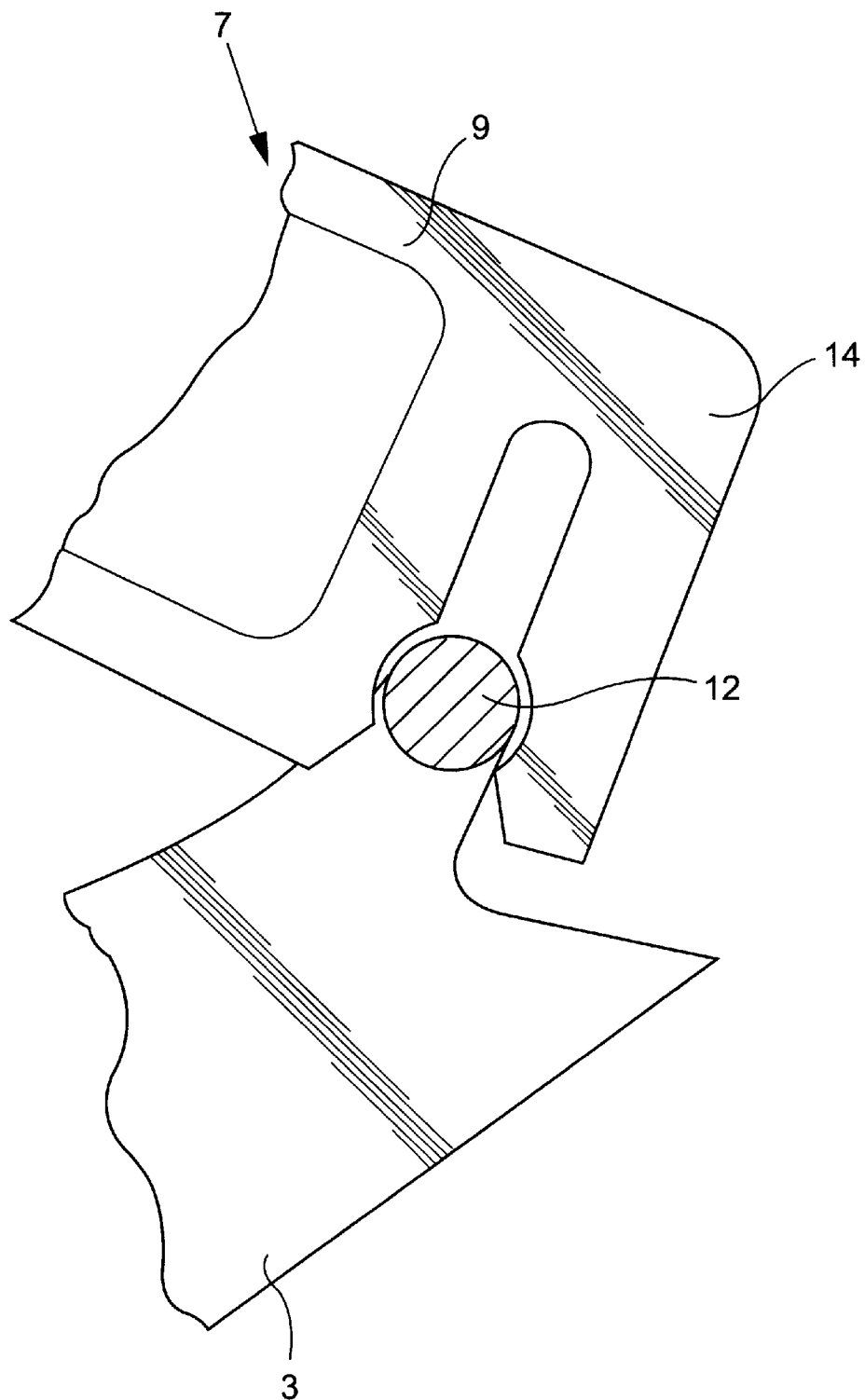
FIG. 5 is an enlarged view of part of a preferred embodiment the mechanism of the invention.

FIG. 5 illustrates an additional clip element 14 which might form an integral part of the extension 9 of the second inertia disc 7. On deployment of the second inertia disc in a pretensioning situation this additional clip element 14 engages the post 12 on the web sensor pawl to lock the web sensor pawl in a spool engagement position.

What is claimed is:

1. A webbing retractor for a vehicle safety restraint system, the retractor comprising safety restraint webbing wound on a rotatable spool, and a locking mechanism comprising a first inertia member and a second inertia member rotatable with the first inertia member, first coupling means arranged to couple the first inertia member to the spool so that the first and the second inertia members rotate with the spool under normal usage conditions, and arranged to decouple the first inertia member from the spool upon rotational acceleration or deceleration of the spool above a predetermined level, second coupling means for decoupling the second inertia member from the first inertia member at excessive levels of acceleration or deceleration of the spool, and holding means operable upon decoupling of the second inertia member from the first inertia member for holding a pawl in locking engagement with the spool to affect the locking up of the spool against rotation even after cessation of the acceleration or deceleration forces.

2. A webbing retractor as claimed in claim 1, in which parts of the locking mechanism are made of zinc casting or of moulded plastic materials.

3. A webbing retractor as claimed in claim 1 in which the second coupling means comprises shear pins or deformable elements which are arranged to shear or bend respectively under acceleration or deceleration forces above a predetermined level to allow rotation of the inertia member independently of the spool.

4. A webbing retractor for a vehicle safety restraint system, the retractor comprising safety restraint webbing wound on a rotatable spool, and a locking mechanism comprising an inertia member, coupling means arranged to couple the inertia member to the spool so that it rotates with the spool under normal usage conditions, and arranged to decouple the inertia member from the spool upon rotational acceleration or deceleration of the spool above a predetermined level, and holding means operable by the inert in member upon decoupling from the spool to hold a locking pawl in locking engagement with the spool to lock the spool against rotation;
 in which the coupling means comprises shear pins or deformable elements which are arranged to shear or bend respectively under acceleration or deceleration forces above a predetermined level to allow rotation of the inertia member independently of the spool.

5. A webbing retractor as claimed in claim 4, in which the shear pins are located in indentations or blind holes arranged to prevent loose parts fouling the retractor mechanism after they have sheared.

6. A webbing retractor as claimed in claim 5, in which the shear pins or deformable elements are formed integrally with the inertia member.

7. A webbing retractor as claimed in claim 4, in which the shear pins or deformable elements are formed integrally with the inertia member.

8. A webbing retractor for a vehicle safety restraint system, the retractor comprising safety restraint webbing wound on a rotatable spool, and a locking mechanism comprising an inertia member, coupling means arranged to couple the inertia member to the spool so that it rotates with the spool under normal usage conditions, and arranged to decouple the inertia member from the spool upon rotational acceleration or deceleration of the spool above a predetermined level, and holding means operable by the inertia member upon decoupling from the spool to hold a locking pawl in locking engagement with the spool to lock the spool against rotation;
 in which the holding means comprises one of an integrally moulded detent and clip on the inertia member.

9. A webbing retractor for a vehicle safety restraint system, the retractor comprising safety restraint webbing wound on a rotatable spool, and a locking mechanism comprising a first inertia member and a second inertia member rotatable with the first inertia member, first coupling means arranged to couple the first inertia member to the spool so that the first and the second inertia members rotate with the spool under normal usage conditions, and arranged to acceleration or deceleration of the spool above a predetermined level, second coupling means for decoupling the second inertia member from the first inertia member at excessive levels of acceleration or deceleration of the spool, and holding means operable upon decoupling of the second inertia member from the first inertia member for holding a pawl in locking engagement with the spool to cause the locking of the spool against rotation; and
 a spring for biasing the second inertia member in a direction so that the holding means remains urged against the pawl.

10. A webbing retractor as claimed in claim 9, in which the spring bias is provided by a coiled torsion spring linking the inertia member to the web sensor inertia element.

11. A webbing retractor for a vehicle safety restraint system, the retractor comprising safety restraint webbing wound on a rotatable spool, and a locking mechanism comprising an inertia member, coupling means arranged to couple the inertia member to the spool so that it rotates with the spool under normal usage conditions, and arranged to decouple the inertia member from the spool upon rotational acceleration or deceleration of the spool above a predetermined level, and holding means operable by the inertia member upon decoupling from the spool to hold a locking pawl in locking engagement with the spool to lock the spool against rotation;
 comprising a spring catch arranged positively to lock the locking mechanism.

12. A webbing retractor as claimed in claim 11, in which the spring catch comprise s an integrally moulded clip on the inertia member.

13. A webbing retractor for a vehicle safety restraint system, the retractor comprising safety restraint webbing wound on a rotatable spool, and a locking mechanism comprising a first inertia member and a second inertia member rotatable with the first inertia member, first coupling means arranged to couple the first inertia member to the spool so that the first and the second inertia members rotate with the spool under normal usage conditiones, and arranged to decouple the first inertia member from the spool upon rotational acceleration or deceleration of the spool above a predetermined level, second coupling means for decoupling the second inertia member from the first inertia member at excessive levels of acceleration or deceleration of the spool, and holding means operable upon decoupling of the second inertia member from the first inertia member for holding a pawl in locking engagement with the spool to cause the locking of the spool against rotation; and wherein the first and second inertia members are positioned in respective, generally parallel planes.

14. The webbing retractor as defined in claim 13 wherein the first and second inertia members are disc-shaped.

15. A webbing retractor for a vehicle safety restraint system, the retractor comprising safety restraint webbing wound on a rotatable spool, and a locking mechanism comprising an inertia member, coupling means arranged to couple the inertia member to the spool so that it rotates with the spool under normal usage conditions, and arranged to decouple the inertia member from the spool upon rotational acceleration or deceleration of the spool above a predetermined level, and holding means operable by the inertia member upon decoupling from the spool to hold a locking pawl in locking engagement with the spool to lock the spool against rotation;

in which the predetermined level corresponds to that produced by a pretensioning operation of the retractor.

16. A webbing retractor for a vehicle safety restraint system, the retractor comprising safety restraint webbing wound on a rotatable spool, a lock bar rotatably disposed relative to a retractor frame and movable under the operation of a lock cup, the lock cup being decoupled from the spool during normal operation of the retractor and linked to move with the spool during other operating conditions, the lock bar movable from an unlocked position to a locked position to stop the spool from rotating;

a web sensor having a first inertia member and a web sensor pawl, the first inertia element being mounted to rotate with the spool under normal operating conditions, wherein under other operating conditions the position of the first inertia member lags the position of the spool to move the web sensor pawl to couple the spool with the lock ring enabling the lock ring to move the lock pawl to stop the spool, the web sensor further including a second inertia member which is movable against the web sensor pawl upon rotational acceleration or deceleration of the spool above a predetermined level to hold a web sensor pawl in its engaged position to maintain the spool in a locked condition.

* * * * *